United States Patent [19]

Lipp et al.

[11] 4,027,471

[45] June 7, 1977

[54] METHOD OF AND APPARATUS FOR SEMI-AUTOMATIC ASSEMBLY OF TRACK-TYPE CHAIN

[75] Inventors: Charles E. Lipp, Morton; Teddy R. Young, E. Peoria, both of Ill.

[73] Assignee: Caterpillar Tractor Co., Peoria, Ill.

[22] Filed: Jan. 16, 1976

[21] Appl. No.: 649,872

[52] U.S. Cl. .................................................. 59/7
[51] Int. Cl.² .......................................... B21L 9/00
[58] Field of Search ........................ 59/7, 8, 11, 12

[56] References Cited

UNITED STATES PATENTS

| | | | |
|---|---|---|---|
| 1,946,911 | 2/1934 | Lindberg | 59/7 |
| 3,028,723 | 4/1962 | Kaplan | 59/7 |
| 3,075,346 | 1/1963 | Quarve | 59/7 |
| 3,097,477 | 7/1963 | Rodgers | 59/7 |
| 3,939,648 | 2/1976 | Cullen | 59/11 |

*Primary Examiner*—C.W. Lanham
*Assistant Examiner*—Gene P. Crosby
*Attorney, Agent, or Firm*—Phillips, Moore, Weissenberger, Lempio & Majestic

[57] ABSTRACT

A method and apparatus is disclosed for assembling articulated chain suitable for use in providing flexible track for heavy vehicles such as earth moving equipment, which chain comprises a plurality of links interconnected by coating, concentrically disposed pins and bushings. Means for providing semi-automatic operation of the apparatus, including indexing of the chain as assembled are described. Method steps and operation of the apparatus to avoid the introduction of bending moments in the previously assembled portion of the chain are disclosed.

9 Claims, 11 Drawing Figures

METHOD OF AND APPARATUS FOR SEMI-AUTOMATIC ASSEMBLY OF TRACK-TYPE CHAIN

BACKGROUND OF THE INVENTION

This invention relates to a method of and apparatus for assembling articulated claim comprising a plurality of links each including a pair of link sides and a coacting, concentrically disposed pin and busing means interconnecting the link sides to each other and to another link of the chain and more particularly to such a method and apparatus which is semi-automatic and which does not introduce bending moments into previously assembled portion of the chain.

The severe operating environment of earth moving equipment and particularly crawler type tractors requires maximum quality in components if satisfactory service and life is to be realized. Specifically, the track chains which support, move and steer crawler type tractors and other earth moving equipment encounter ome of the highest of loads and wear rates to which components of such equipment are exposed.

Thus, such track chains must be made mechanically strong and heavy. However, they must also be flexible since they provide the means for moving the equipment in operation. Such basic incompatibility in function requires great care in fabrication including careful attention to materials and close tolerances in dimensioning of the parts in order to provide the necessary strength while preserving the equally necessary flexibiliy of the chain.

It has been found that articulated chain made of a plurality of links each consisting of a pair of spaced interconnected link sides joined to each other and to another link by coating, concentrically disposed pin and bushing means will provide the necessary strength and flexibility. The link sides each include a pair of cylindrical apertures dimensioned to received the pins and bushings respectively with a press-fit of very close tolerance. Once assembled such chain is capable of providing long and dependable service in the operation of heavy earth moving equipment.

However, assembly of such chain has presented a number of problems, the most severe of which is the difficulty of aligning and pressing the parts of a link to assemble them with each other and with previously assembled portions of the chain without introducing bending moments in the previously assembled portions of the chain or damage to the parts. Such bending moments are highly undesirable since they will complicate the alignment of the parts of additional links for assembly with each other and with the chain due to the close tolerances and the weight and strength of the materials and parts involved.

It is a primary object of the invention to provide a method and apparatus for assembling track chain of the type described above, a link at a time, without introducing bending moments into the previously assembled portion of the track chain.

It is a further object of this invention to provide a semi-automatic method and apparatus for the assembly of track chain, one link at a time, that avoids the introduction of bending moments into previously assembled portions of the track chain.

It is yet another object of this invention to provide such a method and apparatus which does not require manual steps beyond the capability of one human operator in normal operation.

SUMMARY OF THE INVENTION

Briefly, the method and apparatus for assembling chain comprising a plurality of links each consisting of a pair of spaced interconnected link sides articulately joined by coacting concentrically disposed pin and bushing means includes the steps of and means for positioning a first pin and bushing means in a given horizontal plane and supporting such pin and bushing means for slidable endwise movement in such plane. A first pair of link sides are supported on opposite sides of the pin and bushing means in spaced relation thereto but otherwise positioned for interconnection with the bushing thereof in their normal position as assembled into the chain. The first pair of link sides are moved toward each other and into operative contact with the bushing of the first pin and bushing means. A first one of the first pair of link sides is then rigidly locked against movement away from such operative contact while the second one of the first pair of link sides is moved into such operative contact until a press-fit assembly of the side links with the bushing of the pin and bushing means is completed. The first pair of link sides assembled with the first pin and bushing means is then indexed in the given plane perpendicular to the axis of the pin of the first pin and bushing means a distance equal to the spacing between the pin and bushing means of a fully assembled chain. Additional links are added to the chain by supporting a second pin and bushing means for endwise movement in the given plane in the position formerly occupied by the first pin and bushing means. A second pair of link sides are supported on opposite sides of the pin and bushing means in spaced relation thereto but otherwise positioned for interconnection in their normal position as assembled into the chain with the pin of the first pin and bushing means and the bushing of the second pin and bushing means. The second pair of sides are then moved toward each other and into operative contact with the pin of the first pin and bushing means and bushing of the second pin and bushing means at which point the one of the second pair of link sides corresponding to the first one of the first pair of link sides is rigidly locked against movement away from such operative contact while continuing to move the other one of the second pair of link sides into such operative contact until a press-fit assembly of the second pair of link sides with the pin of the first pin and bushing means and the bushing of the second pin and bushing means is completed. The assembled portion of the chain is then indexed to move the second pin and bushing means as described hereinabove with respect to the first pin and bushing means. The positioning of the pin and bushing means and link sides in the method and apparatus of this invention may be carried out manually by a single individual with the method and apparatus being otherwise semi-automatic.

BRIEF DESCRIPTION OF THE DRAWING

The foregoing and other objects and features of this invention will be more fully understood from the following detailed description of a preferred embodiment of the method and apparatus of this invention when read in conjunction with the attached drawing wherein.

DETAILED DESCRIPTION OF PREFERRED EMBODIMENT

Figure 1:
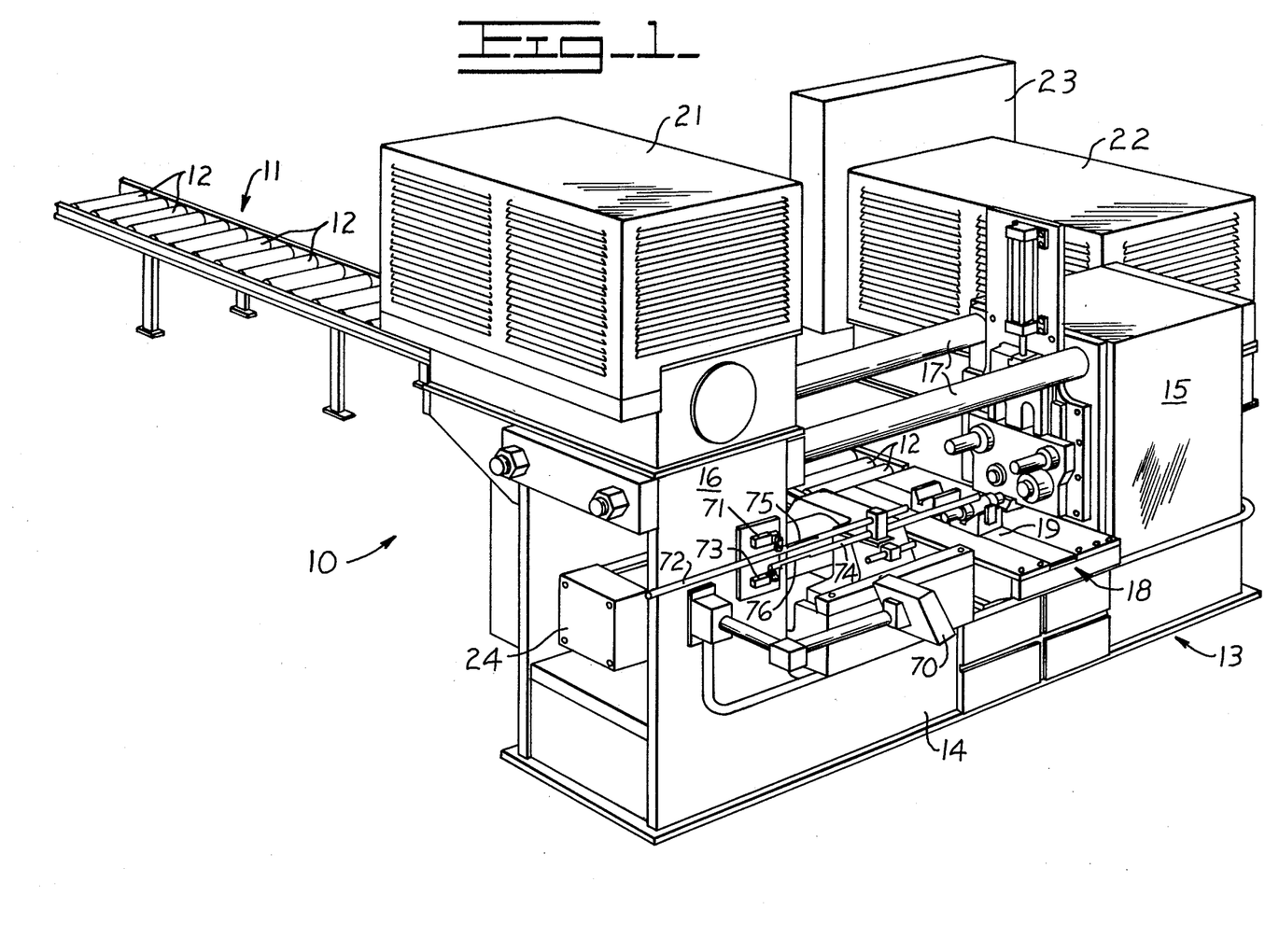
FIG. 1 is a perspective view of a preferred embodiment of the apparatus for assembling track chain in accordance with the teaching of this invention.

Referring to FIG. 1, a preferred embodiment of the apparatus 10 for assembling track chain according to the teaching of this invention is shown in perspective. Such apparatus 10 comprises an elongated bed 11 which may be provided with rollers 12 to facilitate the endwise movement of fully assembled track chain therealong. A work station 13 is located at one end of the bed 1 and the perspective view of FIG. 1 is taken at such one end of the bed 11 in order to show the over-all structural details of the work station 13 according to this embodiment of the invention in relation to the bed 11.

The basic structural element of the work station 13 is a mechanically rigid and structurally rugged hollow frame at the end of the bed 11 provided according to this embodiment of the invention by the horizontal pedestal structure 14 which carries a pair of vertically extending support structures 15 and 16 interconnected at their upper ends by a pair of heavy steel tension rods or columns 17. The upper surface of the pedestal 14 provides an extension 18 of the bed 11 between the support structures 15 and 16 and beneath the tension rods 17. The actual assembly of the links of the track chain takes place on the extension 18 of the bed 11 and such extension 18 includes an indexing means 19 which will be more fully described hereinafter, for moving the chain endwise along the bed 11 as each link is assembled thereto.

As shown in FIG. 1, the work station in accordance with this embodiment of the invention includes various housings as shown at 21, 22, 23 and 24, for example, for which contain the electrical and hydraulic circuits for operating the mechanical elements of the work station 13 in the assembly of track chain. Such mechanical elements of the work station 13 and their operation will be described in detail in connection with FIGS. 2 through 9 of the drawing which figures are enlarged fragmentary perspective views of the work station 13 taken at a slightly different point from the perspective of FIG. 1 with certain parts omitted for clarity.

Figures 2, 3, 4:
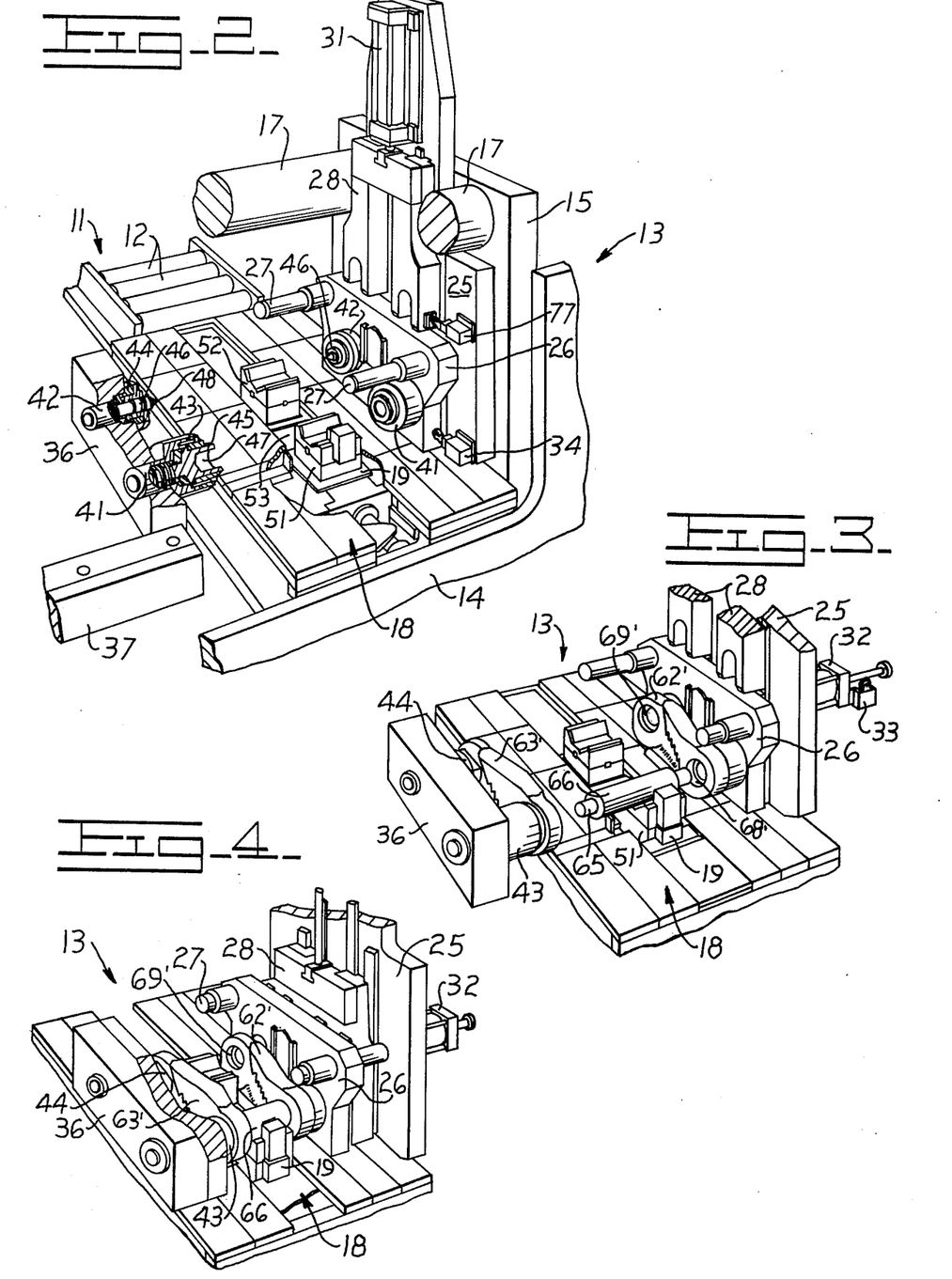
FIG. 2 is an enlarged fragmentary view in perspective of the work station of the apparatus of FIG. 1 with the elements thereof shown in readiness to begin the assembly of track chain and with portions of such elements broken away for clarity of illustration.
FIG. 3 is a simplified fragmentary perspective view similar to FIG. 2 but showing a first pin and bushing means and a first pair of link sides positioned at the work station for assembly.
FIG. 4 is a simplified fragmentary perspective view similar to FIG. 3 but with the elements of the work station shown in the process of executing the press-fit assembly of the first pair of link sides with the bushing of the first pin and bushing means.
Figure 5:
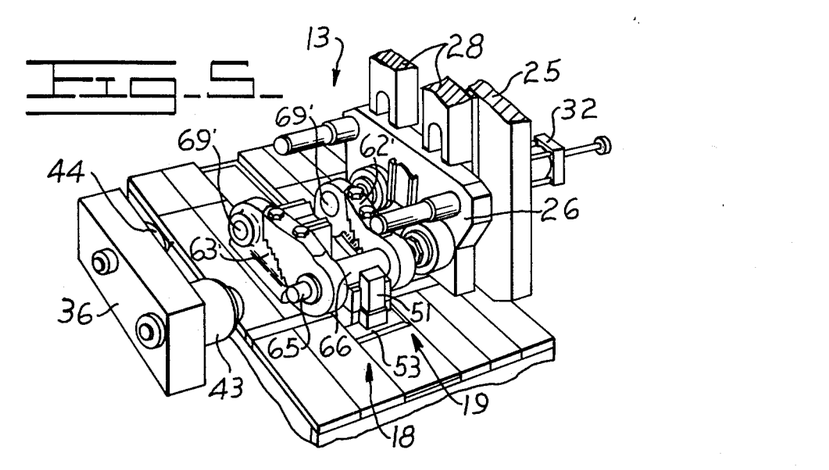
FIG. 5 is a simplified fragmentary perspective view similar to FIG. 4 but showing the elements of the apparatus after completion of the press-fit assembly of the first pair of link sides with the first pin and bushing means.

Referring to FIG. 2, it will be seen that the vertically extending support structure 15 of the pedestal 14 is disposed along the right hand side of the extension 18 of the bed 11. The support structure 15 includes a heavy metal back-up plate 25 having a major surface extending vertically along the right hand side of the extension 18 of the bed 11. A pair of heavy guide rods 27 project from such major surface of the back-up plate 25 above the upper surface of the extension 18 of the bed 11.

A hydraulically actuated pressure plate 26 is mounted on the guide rods 27 for horizontal movement along the upper surface of the extension 18 of the bed 11 from a position adjacent the back-up plate 25 to a position approaching the center of the extension 18. A hydraulically actuated sliding block structure 28 is mounted for vertical movement along the vertical major surface of the back-up plate 25 from a position above the pressure plate 26 to a position between the pressure plate 26 and the back-up plate 25 when the pressure plate has been moved toward the center of the extension 18 of the bed 11.

The hydraulic ram 31 for actuating the sliding block structure is shown in FIG. 2 and the hydraulic ram 32 for actuating the pressure plate 26 is shown in FIGS. 3 through 9. It will be understood that the cylinder of the hydraulic ram 32 as well as the cylinder of the hydraulic ram 31 is mechanically mounted on the support structure 15. The piston rod of the hydraulic ram 31 is connected to the sliding block structure 28 and the piston rod of the hydraulic ram 32 is connected to the pressure plate 26 through an aperture (not shown) in the back-up plate 25.

The hydraulic ram 32 is actuated to move the pressure plate 26 toward the center of the extension 18 of the bed 11 by a manual control to start the semiautomatic assembly operation of the apparatus as will be more fully described hereinafter. However, the operation of the hydraulic ram 31 is automatically controlled by means of microswitch 33 mounted on ram 32 and microswitch 34 mounted on the vertical surface of the back-up plate 25. Microswitch 33 actuates the hydraulic ram 31 to move the sliding block structure downwardly after the pressure plate 26 has been moved out of operative contact with back-up plat 25 at the beginning of an assembly cycle. The microswich 34 terminates the downward movement of the sliding block structure 28 by the hydraulic ram 31 when such sliding block structure 28 is in position between the pressure plate 26 and the back-up plate 25, as best shown in FIG. 4. The upward movement of thesliding block structure 28 by the hydraulic ram 31 at the end of an assembly cycle in order to permit retraction of the pressure plate 26 by the hydraulic cylinder 32 is controlled by other means which will be more fully described hereinafter.

The support structure 16 has been omitted from the FIGS. 2 through 9 in order to enable the active elements along the left hand side of the work station 13 to be more clearly shown. Thus, referring to FIG. 2, a second pressure plate 36 is mounted on the support structure 16 for horizontal movement along the upper surface of the extension 18 of the bed 11 toward and away from the middle thereof as by means of a pair of rigid extensible arms 37 only one of which is shown in FIG. 2 and which arms are omitted in FIGS. 3 through 9 for clarity of illustration. It will be understood that the pressure plate 36 is moved by an appropriate hydraulic ram (not shown) which may act either on the pressure plate 36 itself or on the extensible arms 37 in order to produce the desired movement of the pressure plate 36 toward and away from the middle of the extension 18 of the bed 11.

The pressure plates 26 and 36 are each provided with a first pressure head 41 and a second pressure head 42. The first pressure heads 41 are identical to each other and the second pressure heads 42 are also identified to each other. The pressure heads 41 and 42 mounted on the pressure plate 36 have been broken away in FIG. 2 in order to show important internal structural features thereof. Thus, it will be seen that the pressure head 41 comprises an annular housing 43 with a spring loaded piston 45 therein. Similarly, the second pressure head 42 comprises an annular housing 44 with a spring loaded piston 46 therein. The annular housings 43 and 44 of the first and second pressure heads 41 and 42 are rigidly mounted on the pressure plates 26 and 36 with their axes extending normally to the vertical surfaces thereof at a preset distance above the upper surface of the extension 18 of the bed 11. The spring loaded pistons 45 of the presence heads 41 project from the housings 43 thereof toward each other and are adapted to move along the axis of the housings 43 and be fully received therewithin upon application of sufficient pressure to the pistons 45 to overcome the spring loading thereof. Similarly, the spring loaded pistons 46 of the second pressure heads 42 project from the housings 44 thereof toward each other and are adapted to move along the axis of the housings 44 and be fully received therewithin upon application of sufficient pressure to the pistons 46 to overcome the spring loading thereof.

As best shown in FIG. 2, the opposed ends of the pistons 45 of the first pressure heads 41 are provided with an enlarged cylindrical cavity 47 extending along the axis of the housing 43 thereof. However, as best shown in FIG. 2, the spring loaded pistons 46 of the pressure heads 42 comprise rods or mandrels with the opposed ends of the pistons 46 being provided with a spring-loaded conical projection 48.

The cavities 47 in the opposed ends of the spring loaded pistons 45 of the pressure heads 41 are dimensioned to receive therewithin the ends of the pins of the pin and bushing means which are an integral part of the track chain to be assembled. Similarly, the spring loaded conical projections 48 on the opposed ends of the spring loaded pistons 46 of the second pressure heads 42 are dimensioned to be received in locating depressions formed in the ends of the pins of the pin and bushing means which form integral parts of the track chain to be assembled.

The indexing means 19 according to this embodiment of the invention comprises first and second V-blocks 51 and 52 mounted on a plate 53 in spaced relation to each other. The plate 43 is mounted for reciprocating movement along the upper surface of the extension 18 of the bed 11 in an endwise direction with respect to the bed 11, as will be more fully described hereinafter with respect to FIGS. 10 and 11. The first and second V-blocks project upwardly from the upper surface of the extension 18 of the bed 11 and the first V-block is designed to support a pin and bushing means of the track chain with its axis aligned with the axes of the housings 43 of the first pressure heads 41. The second V-block is designed to support a pin and bushing means of the track chain to be assembled with its axis aligned with the axes of the housings 44 of the second pressure heads 42. The spacing between the axes of a pair of pin and bushing means of the track chain to be assembled as supported on the first and second V-blocks is equal to the final spacing thereof in the fully assembled track chain and the spacing of the axes of such pin and bushing means above the upper surface of the extension 18 of the bed 11 is slightly greater than one-half the width of the link sides of the track chain to be assembled.

Assembly Operation

Referring to FIGS. 3 through 9, the operation of the work station 13 is assembling track chain in accordance with the teaching of this invention will be described. The mechanical elements of FIGS. 3 through 9 are the same as those specifically described with respect to FIG. 2 except that certain of such elements have been omitted from FIGS. 3 through 9 and the reference numerals of FIG. 2 have only been used in FIGS. 3 through 9 where necessary to enable understanding of the operation of the work station 13 in assembling track chain. Structural elements of the track chain are shown in the process of being assembled at the work station 13 in FIGS. 3 through 9.

Figure 8:
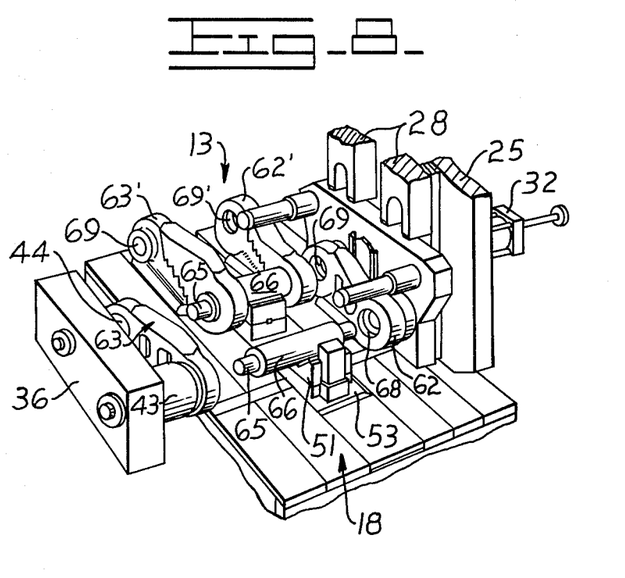
FIG. 8 is a simplified fragmentary perspective view similar to FIG. 7 but showing the second pair of link sides and second pin and bushing means as positioned at the work station of the apparatus prior to assembly.
Figure 9:
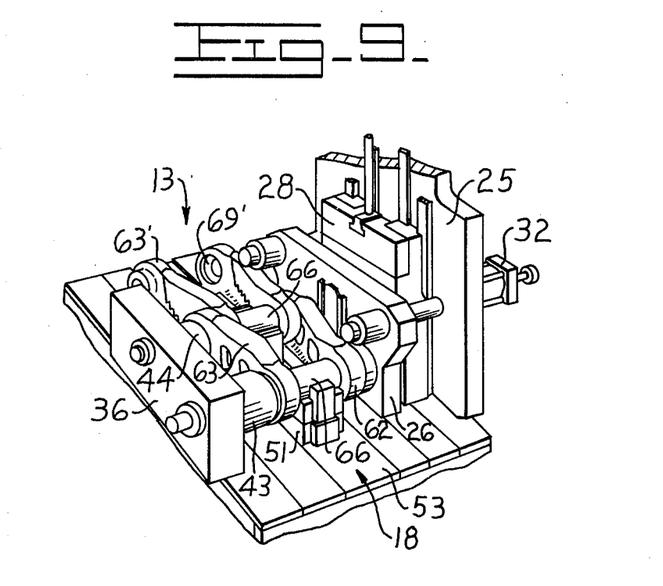
FIG. 9 is a simplified fragmentary perspective view similar to FIG. 8 but showing the elements of the work station in the process of executing the press-fit assembly of the second pair of link sides with the pin of the first pin and bushing means and the bushing of the second pin and bushing means.

Thus it is necessary to consider structural features of the track chain to be assembled by the apparatus according to this embodiment of the teaching of this invention. Such track chain is well known in the art and is essentially identical in structure to that shown in U.S. Pat. No. 3,711,928 issued Jan. 23, 1973. As best shown in FIGS. 8 and 9, such track chain consists of a plurality of links each comprising a pair of link sides 62 and 63 with the sides of each link being interconnected with each other and with an adjacent link by coacting commercially disposed pins 65 and bushings 66. The pins 65 are telescoped within the bushings 66 in a close tolerance sliding fit which allows the bushing 66 to rotate freely about the pin 65.

Each of the link sides 62, 63 have a first cylindrical aperture 68 therethrough at one end which aperture is dimensioned to receive and end of the bushing 66 in a press fit of close tolerance designed to provide an essentially permanent and rigid joint between the link sides 62, 63 and the ends of the bushing 66. Similarly, each of the link sides 62, 63 is provided with an aperture 69 therethrough at the opposite end thereof dimensioned to receive an end of the pin 65 in a press fit of close tolerance to provide an essentially permanent and rigid joint between the link side and the pin 65. As best shown in FIG. 9, the link sides 62, 63 have a stepped configuration in top view whereby the end of the link sides which is fixed to the bushing 66 of a particular pin an bushing means may be overlapped to the outside by the ends of the link sides of the next adjacent link which are fixed to the pin 65 of such pin and bushing means to thereby form articulated joints between the links of the chain.

In view of the stepped configuration of the link sides 62, 63 in order to enable the overlapping interconnection of the sides of one link with the sides of the next adjacent link in the track chain, the first pressure heads 41 must have a different axial length from the axial length of the second pressure heads 42. Thus, as shown in FIGS. 3 through 9, the housings 43 of the first pressure heads 41 project further from the vertical major surfaces of the respective pressure plates 26 and 36 than do the housings 44 of the second pressure heads 42.

As best shown in FIGS. 4 and 9, the housings 43 and 44 of the first and second pressure heads 41 and 42 are compressively forced against the link sides 62 and 63 by the pressure plates 26 and 36 respectively in order to produce the required press-fit between such link sides 62, 63 and the pins 65 and bushings 66 in assembling the track chain. As pointed out above, the pistons 45 and 46 of the pressure heads 41 and 42 engage the bushings 66 and pins 65 respectively in order to hold them in position during the assembly operation. Thus the piston 45 of the pressure head 41 fits within the aperture 68 of the side link 62, 63 and the piston 46 of the pressure head 42 fits within the aperture 69 of the side links 62, 63 in order to facilitate the positioning of the side links 62, 63 for assembly with the pin 65 and bushing 66 associated therewith in the track chain.

Referring to FIG. 3, the assembly of track chain according to the teaching of this invention begins with the manual positioning of a pin 65 with a bushing 66 disposed coaxially thereabout in the first V-block 51 as shown. A first master link side 62' and a second master link side 63' are then manually positioned on the extension 18 of the bed 11 with the apertures 68' and 69' thereof in engagement with the pistons 45 and 46 of the pressure heads 41 and 42 as shown. It will be understood that the master link sides 62' and 63' differ from ordinary link sides 62 and 63 in that each master link side 62', 63' consists of two parts which are bolted together. A master link is used as the first and last link of each fully assembled track chain and thus enable the ends of the track chain to be joined together by disassembling the master links and bolting one-half of each to a corresponding half of the other to form the track chain into a endless loop for use.

Referring to FIG. 4, the actuation of the apparatus in accordance with the teaching of this invention causes the pressure plates 26 and 36 to be moved toward each other along the upper surface of the extension 18 of the bed by means of the hydraulic rams mentioned hereinabove. The pressure plate 26 is moved a given distance at the end of which it is stopped and the sliding block structure 28 is lowered into position between the pressure plate 26 and the back-up plate 25. With the pressure plate 26 thus held rigidly in position, the continued movement of the pressure plate 36 toward the pressure plate 26 will bring the link side 63 into compressive contact with the end of the bushing 66 positioned in the first V-block 51. The ends of the pin 65 which is telescoped within the bushing 66 positioned in the first V-block 51 will be received in the cavities 47 of the pistons 45 of the first pressure heads 41 and the pin 65 will be centered between the pressure heads 41 by the spring loading of the pistons 45 thereof. Simultaneously the ends of the bushing 66 will be forced into the apertures 68' of the master link sides 62' and 63' by the continued movement of the pressure plate 36 toward the pressure plate 26 to produce the required pressure fit of such bushing 66 into such apertures 68'.

Since the pins 65 and bushings 66 can move freely in an endwise direction when positioned in the V-block 51, it is not necessary that the axial length of the pin 65 and bushing 66 be accurately centered when it is manually positioned on the V-block 51. Instead, the engagement of the pin 65 with the cavities 47 in the pistons 45 of the first pressure heads 41 will automatically center the pin. Similarly, the engagement of the bushing 66 with the link sides 62' and 63' as well as with the pistons 45 of the pressure heads 41 will result in the centering of the bushing 66 in the fully assembled master link.

Figure 6:
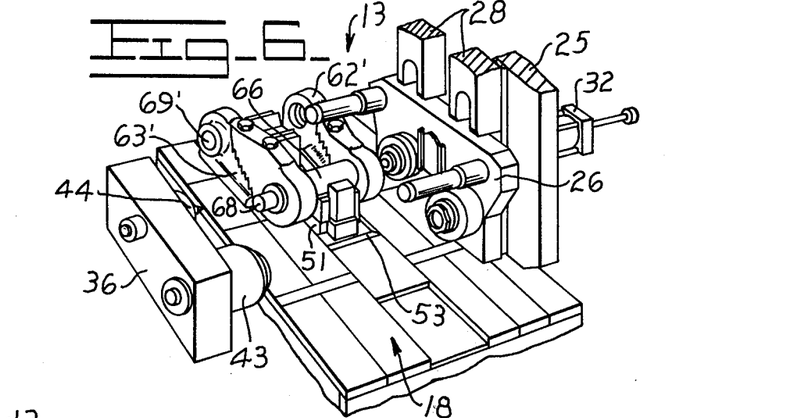
FIG. 6 is a simplified fragmentary perspective view similar to FIG. 5 but showing the elements of the work station in the process of indexing the assembled first pair of link sides and first pin and bushing means.
Figure 7:
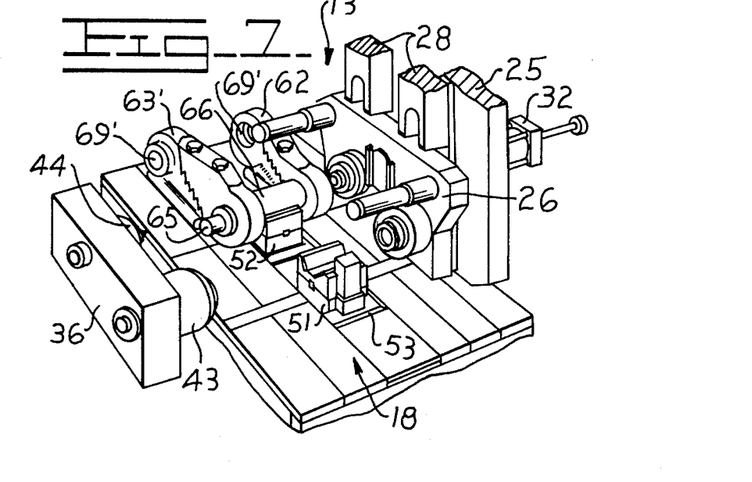
FIG. 7 is a simplified fragmentary perspective view similar to FIG. 6 but showing the elements of the work station together with the assembled first pair of link sides and first pin and bushing member in position for the assembly of a second and subsequent links in the track chain.

Upon completion of the press-fit of the bushing 66 into the apertures 68' of the master link sides 62', 63', the sliding block structure 28 will be automatically raised and the pressure plates 26 and 36 will be automatically retracted as will be more fully described hereinafter. Thus, referring to FIG. 5, the fully assembled master link will be supported on the extension 18 of the bed 11 with the bushing 66 centered in the V-block 51 when the pressure plates 26 and 36 have been fully retracted. The plate 53 carrying the V-block 51 is then automatically moved endwise of the bed 11 as will be more fully described hereinafter to partially transport such master link out of the assembly station 13 and toward the main portion of the bed 11 as shown in FIG. 6. At this point, the V-blocks 51 and 52 are lowered so that they will no longer engage the bushings 66 of the track chain and the plate 53 carrying the V-blocks 51 and 52 is returned to its initial position at which point it is again raised to cause the second V-block 52 to engage the bushing 66 of the master link as shown in FIG. 7. The mechanical details of the indexing means 19 comprising the plate 53 and V-blocks 51 and 52 will be more fully described in connection with FIGS. 10 and 11 and the automatic control thereof will be more fully described hereinafter in connection with FIG. 1.

Referring to FIG. 8, the apparatus of this invention is now automatically returned to its inactive state as will be more fully described hereinafter and a second pin 65 with a second bushing 66 disposed coaxially thereabout is manually positioned in the V-block 51. Ordinary link sides 62 and 63 are then manually positioned on the extension 18 of the bed 11 in engagement with the housings 43 and 44 of the pressure heads 41 and 42 and with the apertures 68 and 69 thereof in positioning engagement with the pistons 45 and 46 of the pressure heads 41 and 42.

Referring to FIG. 9, the apparatus of this invention is then manually actuated, causing the pressure plates 26 and 36 to move toward each other along the upper surface of the extension 18 of the bed 11 as described hereinabove with respect to FIG. 4. Again, the pressure head 26 is moved a fixed distance and then rigidly held by the lowering of the sliding block structure 28. The continued movement of the pressure plate 36 toward the pressure plate 26 produces a press-fit not only between the second bushing 66 and the apertures 68 of the link sides 62 and 63 but also a press-fit between the apertures 69 of the link sides 62, 63 and the ends of the first pin 65 which is coaxially disposed within the first pushing 66 heretofore press-fit into the master link sides 62' and 63'. The fact that the pressure plate 26 is rigidly held in a fixed position during each assembly operation accurately positions one side of the previously assembled links of the track chain and prevents the introduction of bending moments into such previously assembled links of the track chain during the assembly of further links as shown in FIG. 9.

The automatic retraction of pressure plates 26 and 36 and the indexing of the assembled portion of the track chain endwise of the bed 11 and onto the main portion thereof is repeated as described hereinabove. Thus, the assembly station 13 is automatically prepared for the positioning of additional pins 65 and bushings 66 as well as additional link sides 62, 63 on the extension 18 of the bed 11 for assembly. When a track chain consisting of a preselected number of links has been fully assembled, a second master link will be loaded into the assembly station 13 for assembly as the last link in the previously assembled chain and the first link of the next track chain to be assembled.

Referring again to FIG. 1, the apparatus 10 according to this embodiment of the teaching of this invention includes a main control panel 70 located adjacent the assembly station for easy access by the operator. The control panel 70 may include a variety of manually operable controls including a button for deactivating the automatic control circuit together with buttons for manual initiation of various ones of the automatically controlled steps in the assembly cycle. Most importantly, control panel 70 includes a pair of series connected control buttons requiring simultaneous operation, one by each hand of the operator, in order to initiate the automatic cycle of the apparatus.

Simultaneous actuation of the two automatic cycle start buttons will cause the pressure plates 26 and 36 to be moved toward each other along the upper surface of the extension 18 of the bed 11. As discussed in connection with FIG. 2, the microswitches 33 and 34 will automatically stop the pressure plate 26 at a predetermined point and lower the sliding block structure 28 between the pressure plate 26 and the back-up plate 25. The manually operable controls on the control panel 70 including the pair of series connected cycle start buttons are conventional and are not shown in the drawing.

However, a pair of microswitches 71 and 73 are shown mounted on the left-hand support structure 16 in FIG. 1 together with control rods 72 and 74 mounted on the pressure plate 36. The microswitches 71 and 73 cooperate with the control rods 72 and 74, respectively, to control the extension of the pressure plate 36. Thus, the control rod 72 is provided with a flat 75 which cooperates with the microswitch 71 to cause rapid movement of the pressure plate 36 for a given distance at the end of which the further extension of the pressure plate proceeds much more slowly.

The extension of the pressure plate 36 continues at the reduced speed until the press-fit of the link sides 62 and 63 with the pin 65 and bushing 66 as described hereinabove has been completed. A pressure valve, not shown, is included in the hydraulic system operating the pressure plate 36 which pressure valve is responsive to a pre-set maximum pressure in the system which cannot be attained until the press-fit of the side links with a pin and bushing has been completed and at such pressure reverses the flow of hydraulic fluid to retract the pressure plate 36, raise the sliding block structure 28 and retract the pressure plate 26, after the sliding block structure 28 is clear of pressure plate 26 as determined by microswitch 77 mounted on back-up plate 25 as shown in FIG. 2.

Upon retraction of the pressure plate 36, the control rod 74, which is provided with a flat 76, will engage the microswitch 73. The relative locations of the flat 76 of the rod 74 and a flat 75 on the rod 72 and the action of the microswitches 71 and 73 cooperate to actuate the indexing means 19 after the pressure plates 26 and 36 have been retracted clear of the assembled links of the chain.

Indexing Means

Figure 10:
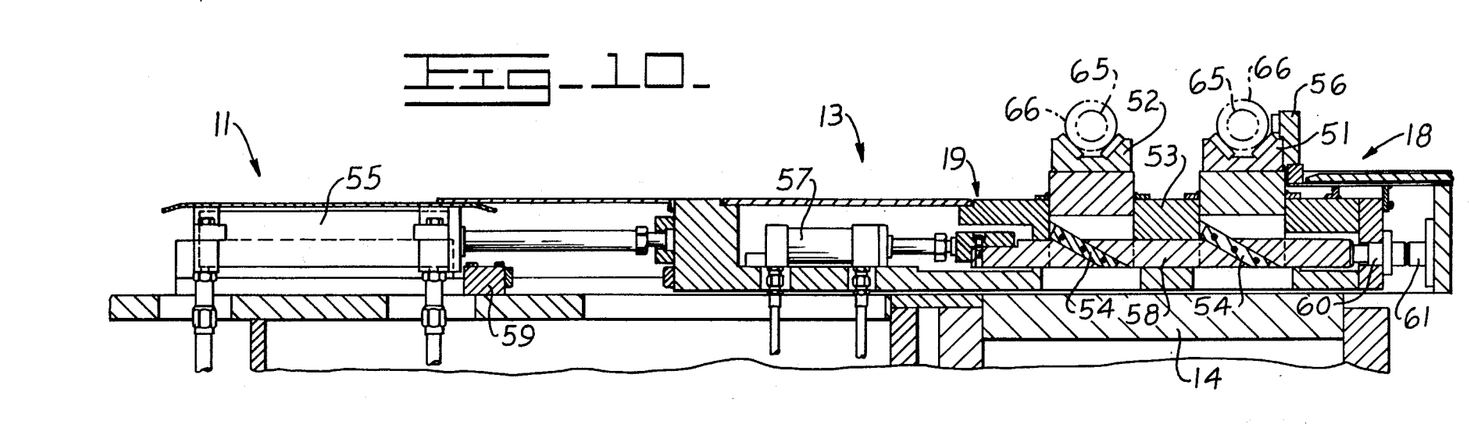
FIG. 10 is a cross-sectional view of the indexing means of the work station of the apparatus for practicing the method in accordance with the teaching of this invention taken at right angles to the axis of the pins of the pin and bushing means as shown in FIG. 9.
Figure 11:
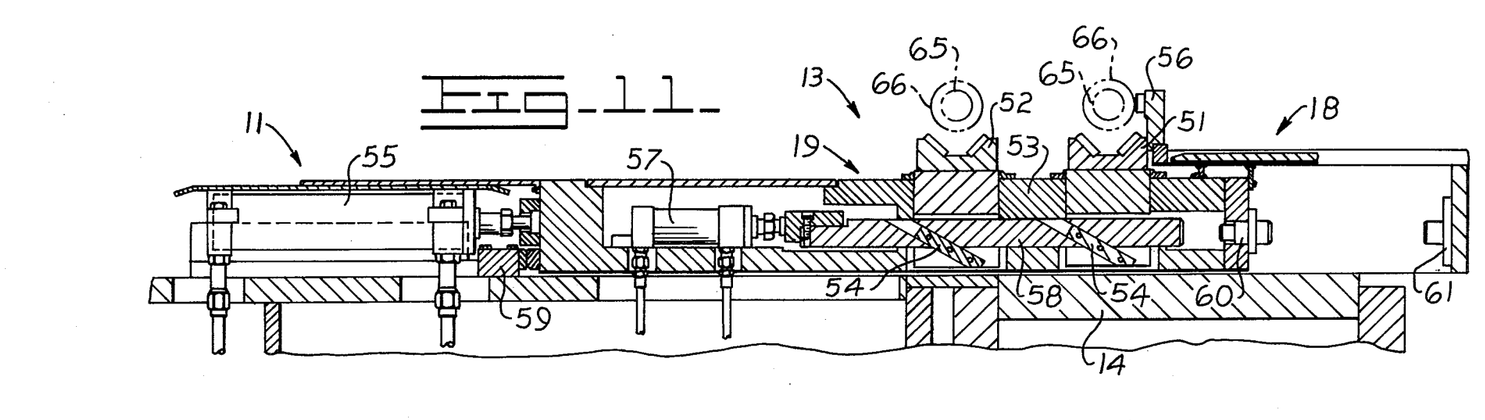
FIG. 11 is a cross-sectional view similar to FIG. 10 but showing the elements of the indexing means at an intermediate point in their indexing operation.

Referring to FIGS. 10 and 11, a cross-section of the extension 18 of the bed 11 at the work station 13 is presented in order to show the mechanical elements of the indexing means 19 in their relative positions at the two opposite extremes of the reciprocating action of such indexing means 19. Thus, in FIG. 10, the indexing means 19 is shown with the elements thereof in their normal or non-actuated position and a pair of pin 65 and bushing 66 assemblies are indicated in dotted lines as supported on the V-blocks 51 and 52 carried by the plate 53. The plate 53 is mounted for horizontal sliding movement on the pedestal 14 and the V-blocks 51 and 52 are slidably mounted on the plate 53 by means of inclined plane members 54 for vertical movement with respect to such plate 53.

The support plate 53 is caused to slide horizontally to the left from its position as shown in FIG. 10 to its position as shown in FIG. 11 and back again to its position as shown in FIG. 10 through the action of a double acting hydraulic ram 55. It will be seen that as the slide member 53 moves to the left, the pin 65 and bushing 66 assemblies carried in the V-blocks 51 and 52 will also be moved to the left and to this end a rigid stop member 56 is carried by the slide member to the right of the V-block 51 in a position to engage the pin 65 and bushing 66 assembly carried by V-block 51 and insure that it will remain seated in the V-block 51 throughout the indexing motion of the slide member 53 to the left from its position shown in FIG. 10.

Referring to FIGS. 1 through 9, it should be remembered that the height of the pin 65 and bushing assemblies above the bed 11 including the extension 18 thereof is determined by the side links 62 and 63 of the assembled chain. In addition, it is pointed out that the bed 11 is provided with rollers 12 in order to reduce the frictional forces which would oppose the indexing motion of the assembled chain to the left of the apparatus as shown in the drawing. Thus, the forces imparted to the assembled chain by the V-blocks 51 and 52 with the assistance of the stop member 56 will be sufficient to move a fully assembled track chain consisting of a large number of links along the bed 11, the rollers 12 of which will also tend to reduce the possibility that lateral bending moments will be introduced into the fully assembled chain during indexing thereof.

As shown in FIGS. 10 and 11, a second double acting hydraulic ram 57 is carried by the support plate 53 throughout its sliding horizontal movement with respect to the pedestal 14. The hydraulic ram 57 is mechanically coupled to a slide member 58 which is mounted with respect to the support plate 53 for horizontal sliding movement with respect thereto. The slide member 58 is adapted to cooperate with the inclined plane members 54 to impart vertical movement to the V-blocks 51 and 52 with respect to the support plate 53. Thus horizontal sliding movement of the slide member 58 to the left with respect to the support plate 53 from the relative positions thereof shown in FIG. 10 to the relative positions thereof shown in FIG. 11 will result in a downward movement of the V-blocks 51 and 52 with respect to the support plate 53 from the relative positions thereof shown in FIG. 10 to the relative positions thereof shown in FIG. 11. It will be seen that the downward movement of the V-blocks 51 and 52 to their relative positions as shown in FIG. 11 will remove them from engagement with the pin 65 and bushing 66 assemblies which will then be supported above the extension 18 of the bed 11 by the link sides 62 and 63. Thus, actuation of the double-acting hydraulic ram 55 to return the support plate 53 from its position as shown in FIG. 11 to its position as shown in FIG. 10 while maintaining the V-blocks 51 and 52 in their lowered position with respect to the support plate 53 as shown in FIG. 11 will free the V-block 51 to receive a further pin 65 and bushing assembly when the double-acting ram 57 is actuated to return the slide member 58 from its position as shown in FIG. 11 to its position as shown in FIG. 10 returning the V-blocks 51 and 52 to their initial raised position above the support plate 53. At this point the semiautomatic operation of the apparatus of this invention is completed and the apparatus will remain at rest until the operator has loaded a further pin 65 and bushing 66 assembly onto the V-block 51 and has positioned a further pair of link sides 62 and 63 on the pressure heads 41 and 42 of the pressure plates 26 and 36 in preparation for a further semiautomatic cycle of the apparatus which must be initiated by the operator.

From the above it will be understood that the indexing action of the indexing means 19 is automatically initiated by the control rods 72 and 74 which actuate the double-acting hydraulic ram 55 to move the support plate 53 to the left from its position as shown in FIG. 10 toward its position as shown in FIG. 11. According to the embodiment of this invention shown in the drawings, a microswitch 59 is mounted on the pedestal 14 in a position to be engaged by the support plate 53 to terminate the sliding movement thereof to the left as shown in FIGS. 10 and 11. Such microswitch 59 will also actuate the double-acting hydraulic ram 57 to initiate the movement of the slide member 58 to the left on termination of such sliding movement of the support plate 53.

A microswitch 60 carried by the support plate 53 in engagement with the slide member 58 in its position as shown in FIG. 10 operates to actuate the hydraulic ram 55 to return the support plate 53 from its position shown in FIG. 11 to its position shown in FIG. 10 as the V-blocks 51 and 52 are lowered through the movement of the slide members 58 to the left by the double-acting hydraulic ram 57. Finally, a further microswitch 61 is rididly mounted with respect to the pedestal 14 to engage the support plate 53 in its position as shown in FIG. 10. The microswitch 61 is adapted to terminate the movement of the support plate 53 to the right by the double-acting hydraulic ram 55 and to initiate the return of the slide member 58 to the right by the double-acting hydraulic ram 57 into engagement with the microswitch 60 at which point the semiautomatic operation of the indexing means 19 is terminated.

It should be understood that the arrangement of the various controls including control rods 72 and 74 and microswitches 33, 34, 59, 60, 61, 71, 73, 77 may be altered by those skilled in the art as desired so long as the required sequence of the semiautomatic operation of the apparatus according to this invention is preserved. In addition, it is believed that those skilled in the art will make other modifications in the teaching of this invention without departing from the scope thereof. The essential feature of apparatus according to the teaching of this invention is the avoidance of the introduction of bending moments into the fully assembled portion of the track chain during the assembly operation. Thus the method and apparatus of this invention may be modified in various ways so long as one side of the track chain is rigidly held in a fixed position throughout the assembly of additional links thereto and the assembled track chain is indexed in a manner which reduces the introduction of bending moments therein toward minimum.

What is claimed is:

1. The method of assembling chain comprising a plurality of links each consisting of a pair of spaced interconnected link sides articulately joined by coacting, concentrically disposed pin and bushing means; said method comprising the steps of:
    a. positioning a first one of said pin and bushing means in a given horizontal plane and supporting said pin and bushing means for slidable endwise movement in said plane;
    b. supporting a first pair of said link sides on opposite sides of said pin and bushing means in spaced relation thereto but otherwise positioned for interconnection with the bushing thereof in their normal position as assembled into said chain;
    c. moving said first pair of link sides toward each other until a first one of said first pair of link sides has reached a given point in space;
    d. rigidly locking said first one of said first pair of said link sides at given point in space against movement away from the second one of said first pair of link sides while continuing to move said second one of said first pair of link sides toward said first one thereof and into operative contact with said bushing of said first one of said pin and bushing means until a press-fit assembly of said link sides with said bushing of said pin and bushing means is complete, and
    e. indexing said first pair of link sides assembled with said first one of said pin and bushing means in said given plane and perpendicular to the axis of the pin of said first one of said pin and bushing means.

2. The method of assembling a chain as claimed in claim 1 including the further steps of:
    f. supporting a second one of said pin and bushing means for endwise movement in said given horizontal plane in parallel relation to said first one of said pin and bushing means and in the position formerly occupied thereby;
    g. supporting a second pair of said link sides on opposite sides of said pin and bushing means in spaced relation thereto but otherwise positioned for interconnection in their normal position as assembled into said chain with said pin of said first pin and bushing means and said bushing of said second pin and bushing means;

h. moving said second pair of link sides toward each other until a first one of said second pair of link sides has reached said given point in space;

i. rigidly locking said first one of said second pair of link sides at said given point in space against movement away from the second one of said second pair of link sides while continuing to move said second one of said second pair of link sides toward said first one thereof and into operative contact with said pin of said first pin and bushing means and said bushing of said second pin and bushing means until a press-fit assembly of said second pair of link sides with said pin of said first pin and bushing means and said bushing of said second pin and bushing means is complete.

3. Apparatus for assembling chain comprising a plurality of links each consisting of a pair of spaced interconnected link sides articulately joined by coacting, concentrically disposed pin and bushing means; said apparatus comprising an elongated generally horizontal bed adapted to slidably support the assembled chain on the upper surface thereof and a work station for assembling said chain at one end of said bed; said work station comprising:

a. a first pressure plate having a vertically extending work surface mounted at one side of said bed for movement transversely of said bed along the upper surface thereof from a first position at the side of said bed to a second position over said bed and back to said first position thereof;

b. back-up plate means for selectively locking said first pressure plate in said second position thereof against movement toward said first position thereof;

c. a second pressure plate having a vertically extending work surface mounted opposite said first pressure plate at the other side of said bed for movement transversely of said bed along the upper surface thereof toward and away from said second position of said first pressure plate; and d. supporting means for supporting a pair of said coacting, concentrically diposed pin and bushing means of said chain above said bed in position for assembly with a pair of link sides of said chain when supported on said bed at said work station in their normal position in said chain, said support means being centrally located between said first and second pressure plates and said pressure plates including locating means for positioning said pair of link sides along said bed with respect to said support means.

4. Apparatus for assembling chain as claimed in claim 3 wherein said support means for supporting a pair of said coacting, concentrically disposed pin and bushing means includes means for indexing said chain comprising means for moving said pair of pin and bushing means a horizontal distance equal to the spacing between said pair of pin and bushing means in the fully assembled chain.

5. Apparatus for assembling chain as claimed in claim 4 wherein said support means comprises a pair of V-blocks carried by a support plate, said V-blocks being spaced from each other by a given distance whereby the axes of said pair of said pin and bushing means supported thereby are spaced from each other by a distance equal to the spacing between said coacting, concentrically disposed pin and bushing means in said chain when fully assembled and said means for indexing said chain comprises means for reciprocating said support plate through a horizontal distance equal to said given distance and means for reciprocating said V-blocks through a vertical distance whereby said V-blocks alternately support said pin and bushing means and have their upper extremities spaced downwardly from said pin and bushing means.

6. Apparatus for assembling chain as claimed in claim 3 wherein said means included on said pressure plates for positioning said pair of link sides along said bed with respect to said support means includes means for positioning, transversely of said bed, said pair of said coacting, concentrically disposed pin and bushing means supported by said support means.

7. Apparatus for assembling chain as claimed in claim 6 wherein said means included on said pressure plates for positioning said pair of link sides along said bed with respect to said support means comprises a pair of first pressure heads identical to each other and each mounted on a different one of said first and second pressure plates and a pair of second pressure heads identical to each other and each mounted on a different one of said first and second pressure plates; said first and second pressure heads each including an annular housing having a spring-loaded coaxial piston projecting therefrom and mounted for axial movement into said housing.

8. Apparatus for assembling chain as claimed in claim 7 wherein the axes of said annular housings of said first and second pressure heads are spaced from each other by a distance equal to the spacing between the axes of said coacting, concentrically disposed pin and bushing means in said chain when fully assembled, said annular housing of said first pressure head has an axial length greater than the axial length of said annular housing of said second pressure head, said piston of said first pressure head has an external diameter slightly less than the external diameter of the bushing of said pin and bushing means and said piston of said second pressure head has an external diameter slightly less than the external diameter of the pin of said pin and bushing means.

9. Apparatus for assembling chain as claimed in claim 8 wherein said piston of said first pressure head is provided with a cylindrical cavity in the free end thereof coaxial with said piston and said annular housing of said first pressure head, said cylindrical cavity having an internal diameter slightly greater than said external diameter of said pin of said pin and bushing means.

* * * * *